United States Patent
Hogendoor

(10) Patent No.: US 12,320,711 B2
(45) Date of Patent: Jun. 3, 2025

(54) METHOD FOR CALIBRATING A TEMPERATURE MEASURING UNIT BASED ON ULTRASONIC MEASUREMENT, METHOD FOR MEASURING THE TEMPERATURE OF A MEDIUM, TEMPERATURE MEASURING UNIT AND ULTRASONIC FLOWMETER

(71) Applicant: KROHNE AG, Basel (CH)

(72) Inventor: Cornelis Johannes Hogendoor, BG Spijk (NL)

( * ) Notice: Subject to any disclaimer, the term of this patent is extended or adjusted under 35 U.S.C. 154(b) by 595 days.

(21) Appl. No.: 17/571,111

(22) Filed: Jan. 7, 2022

(65) Prior Publication Data
US 2022/0228930 A1  Jul. 21, 2022

(30) Foreign Application Priority Data
Jan. 21, 2021 (DE) ............ 10 2021 101 256.2

(51) Int. Cl.
  *G01K 11/24* (2006.01)
  *G01N 29/024* (2006.01)
(52) U.S. Cl.
  CPC .......... *G01K 11/24* (2013.01); *G01N 29/024* (2013.01); *G01N 2291/02881* (2013.01)
(58) Field of Classification Search
  CPC .... G01K 11/24; G01K 15/005; G01N 29/024; G01N 2291/02881; G01F 1/668
  See application file for complete search history.

(56) References Cited

U.S. PATENT DOCUMENTS

| | | | |
|---|---|---|---|
| 6,053,054 A | 4/2000 | Wusterbarth et al. | |
| 8,528,382 B2 | 9/2013 | Van Brakel et al. | |
| 2011/0239730 A1 | 10/2011 | Van Brakel et al. | |
| 2015/0377691 A1* | 12/2015 | Ceglia | G01F 25/15 |
| | | | 73/1.16 |

FOREIGN PATENT DOCUMENTS

| | | |
|---|---|---|
| DE | 102010035859 A1 | 3/2011 |
| DE | 102010014038 A1 | 10/2011 |
| JP | 2005315801 A * | 11/2005 |
| WO | 2014039873 A1 | 3/2014 |

* cited by examiner

*Primary Examiner* — Jennifer Bahls
(74) *Attorney, Agent, or Firm* — Patrick D. Duplessis

(57) ABSTRACT

A method for calibrating a temperature measuring unit based on ultrasound measurement includes: establishing an empirical functional relationship between the medium temperature of a medium to be measured and the velocity of sound of a measurement signal passing through the medium to be measured; capturing at least the velocity of sound of the measurement signal, the temperature measured by means of a temperature sensor, and the time variation of the sensor temperature at at least two measuring points, wherein the at least two measuring points have a different medium temperature; determining the medium temperature from the measured temperature, taking into account the time variation of the sensor temperature, so that at least two pairs of values and exist; running a compensating curve through the pairs of values which corresponds to the empirical functional relationship; and storing the functional relationship.

11 Claims, 5 Drawing Sheets

METHOD FOR CALIBRATING A TEMPERATURE MEASURING UNIT BASED ON ULTRASONIC MEASUREMENT, METHOD FOR MEASURING THE TEMPERATURE OF A MEDIUM, TEMPERATURE MEASURING UNIT AND ULTRASONIC FLOWMETER

TECHNICAL FIELD

The invention is based on a method for calibrating a temperature measuring unit based on ultrasonic measurement, wherein the temperature measuring unit has an ultrasonic measuring device with at least one ultrasonic transmitter and at least one ultrasonic receiver, wherein a temperature sensor is provided.

BACKGROUND

Furthermore, the invention relates to a method for measuring the temperature of a, preferably flowing, medium with a temperature measuring unit, wherein the temperature measuring unit comprises an ultrasonic measuring device with at least one ultrasonic transmitter and at least one ultrasonic receiver.

Furthermore, the invention relates to a temperature measuring unit for measuring the temperature of a medium with at least one ultrasonic measuring device, wherein the ultrasonic measuring device comprises at least one ultrasonic transmitter and at least one ultrasonic receiver, and has a control and evaluation unit.

Finally, the invention relates to an ultrasonic flowmeter with a measuring tube and with an ultrasonic measuring device, wherein the ultrasonic measuring device comprises at least one ultrasonic transmitter and at least one ultrasonic receiver, with at least one temperature measuring unit.

The measurement of the temperature of a fluid medium, in particular the measurement of temperature changes, requires temperature sensors that measure quickly and reliably. Flowing media, in particular, often exhibit a rapidly changing temperature.

To measure high process temperatures, conventional temperature sensors are often covered with an additional metal housing. As a result, when the temperature changes, the metal housing changes temperature more slowly than the medium, so that rapid temperature changes cannot be detected. In the event of temperature changes, such a temperature sensor therefore exhibits sluggish behavior.

It is known from the prior art that the speed of sound of a measurement signal propagating through the medium to be measured is dependent on the temperature of the medium. For some fluids, such as water, the relationship between the speed of sound and the temperature of water is known.

In this context, the document WO 2014/039873 A1 discloses a method for determining the temperature of a flowing medium by means of a pair of ultrasonic transducers, wherein a conventional temperature sensor is present and wherein the temperature measured by means of the ultrasonic transducers is used to correct or control the temperature measured by means of the conventional temperature sensor. In this regard, this document is based on a known relationship between the speed of sound and the temperature of the medium.

However, the relationship between the temperature of the medium and the speed of sound of a measurement signal propagating through the medium is not always known.

SUMMARY

Based on the described prior art, an object of the invention is to provide a method for calibrating a temperature measuring unit based on ultrasonic measurement, so that a temperature measurement based on ultrasonic measurement has a particularly high accuracy.

In addition, an object of the invention is to disclose a method for measuring the temperature of a medium as well as a temperature measuring unit and an ultrasonic flowmeter that enables a particularly accurate temperature measurement.

According to a first teaching of the present invention, the object set forth above is achieved by a method described in the introduction in that the method comprises the following steps:

establishing an empirical functional relationship $T_M(c)$ between the medium temperature $T_M$ of a medium to be measured and the velocity of sound $c$ of a measurement signal passing through the medium to be measured, wherein at least the velocity of sound $c$ of a measurement signal, the temperature $T_{sensor}$ measured by means of a temperature sensor, and the time variation of the sensor temperature $dT/dt$ are captured at at least two measurement points, wherein the at least two measurement points have a different medium temperature $T_M$, wherein the medium temperature $T_M$ is determined from the measured temperature $T_{sensor}$ taking into account the time variation of the sensor temperature $dT/dt$, so that at least two pairs of values $(T_{M1}, c_1)$ and $(T_{M2}, c_2)$ exist, and wherein a compensation curve is made to run through the pairs of values which corresponds to the empirical functional relationship $T_M(c)$, storing the functional relationship $T_M(c)$ in the temperature measuring unit.

In principle, the temperature sensor can be part of the temperature measuring unit or can be arranged as a separate component in the immediate vicinity of the ultrasonic measuring unit.

In this respect, the invention is based on the idea of calibrating the temperature measuring unit individually for the medium to be measured, taking into account not only the simple measurement of the temperature by a temperature sensor and the corresponding velocity of sound, but also the sluggishness of the temperature sensor. Since the determination of the medium temperature $T_M$ is carried out taking into account the sluggishness of the temperature sensor, this determination has a particularly high accuracy, which is continued in a particularly high accuracy of the temperature measurement via the velocity of sound of the temperature measuring unit according to the invention.

Particularly preferably, before the temperature measuring unit is put into operation, the relationship between the velocity of sound $c$ and the temperature $T_M$ of the medium can be determined by the calibration according to the invention for a plurality of media and stored.

During operation of the temperature measuring unit, the temperature of the medium can then be determined particularly easily and quickly by measuring the velocity of sound $c$ of a measuring signal. In particular, rapid temperature changes can be determined by means of measuring the velocity of sound $c$ of a measurement signal through the medium to be measured.

According to a first advantageous design, the temporal variation of the sensor temperature $dT/dt$ and/or the temporal variation of the measured velocity of sound dc/dt is below a fixed limit value at at least two measuring points.

This ensures that the temperature sensor at the measuring points has the temperature of the medium to be measured. In addition, a substantially constant velocity of sound can ensure that the medium to be measured does not exhibit any temperature fluctuations.

According to a particularly preferred design, the temporal variation of the sensor temperature dT/dt and/or the temporal variation of the measured velocity of sound dc/dt is below a specified limit value at each measuring point. This design is particularly simple in that the measured sensor temperature $T_{sensor}$ corresponds directly to the medium temperature $T_M$. By measuring the sensor temperature $T_{sensor}$ and the velocity of sound c at the measuring points 1 . . . n, the value pairs $(T_{M1}, c_1)$ and $(T_{M2}, c_2)$ to $(T_{Mn}, c_n)$ are therefore obtained directly.

However, it is also particularly preferred if a time constant τ describing the inertia of the temperature sensor is additionally taken into account when determining the medium temperature $T_M$ from the sensor temperature $T_{sensor}$.

The time constant τ is defined by $$\tau=(m*c)/(h*A),$$

where
m=mass of the temperature sensor
c=heat capacity of the temperature sensor
h=heat transfer coefficient
A=area of the temperature sensor covered by the medium.

Except for the heat transfer coefficient, which is to be estimated as shown below, all parameters are constant.

According to this design, not only those measuring points can be taken into account at which the time variation of the measured temperature dT/dt is smaller than the specified limit value. Rather, when determining the medium temperature $T_M$ from the measured sensor temperature $T_{sensor}$, all temperature values in the course of a temperature change of the temperature sensor can also be taken into account. This embodiment thus has the advantage that the calibration can be carried out with a particularly low expenditure of time.

According to a further advantageous design, in order to determine the medium temperature $T_M$, taking into account the measured sensor temperature $T_{sensor}$ and the time variation dT/dt, the time constant τ is estimated in such a way that the at least two pairs of values $(T_{M1}, c_1)$ and $(T_{M2}, c_2)$ are arranged on a smooth curve. Particularly preferably, a plurality of measurement points is measured so that, after the estimation of τ, a plurality of measurement points $(T_{M1}, c_1)$ to $(T_{Mn}, c_n)$ are provided.

According to another preferred embodiment, the medium temperature $T_M$ is determined from the measured sensor temperature $T_{sensor}$ and the time variation dT/dt of the sensor temperature by means of the relation $T_M=T_{sensor}+\tau*dT/dt$, where the time constant τ is estimated such that the at least two pairs of values $(T_{M1}, c_1)$ and $(T_{M2}, c_2)$ are arranged on a smooth curve.

A smooth curve is understood to mean, in particular, a functional relationship between the medium temperature $T_M$ and the velocity of sound c, wherein each value of the velocity of sound c can be assigned exactly one value of the medium temperature $T_M$.

Furthermore, it is advantageous if the pressure of the medium is additionally measured at each measuring point and if a functional relationship $T_M(c,p)$ is established between the medium temperature $T_M$, the velocity of sound c and the pressure of the medium p.

The accuracy of the measurement of the temperature can be further increased by this design.

According to a second teaching, the object described above is achieved by a method described at the beginning for measuring the temperature of a, preferably flowing, medium with a temperature measuring unit in that the temperature measuring unit is calibrated with one of the methods described above, that the velocity of sound c of a measuring signal passing through the medium to be measured is measured, and that the temperature of the medium is determined from the stored relationship $T_M(c)$.

Such a method has the advantage that the temperature of a medium, in particular the temperature of a flowing medium, can be detected particularly accurately and particularly quickly. Furthermore, both temperature curves in real time and short-term temperature fluctuations can be captured.

According to an advantageous design, the temperature measuring unit has a temperature sensor, wherein, during operation, the temperature of the medium is determined at least intermittently both via the velocity of sound and via the temperature sensor, and wherein, in particular, in the case in which temporal variation of the temperature dT/dt is below a specified limit value, the temperature $T_M$ determined via the speed of sound is compared with the sensor temperature $T_{sensor}$. This design has the advantage that a correct determination of the medium temperature can be permanently checked during operation. If there is a deviation, appropriate corrective measures can be taken at an early stage.

According to one design, the temperature measuring unit is automatically recalibrated according to one of the previously described methods and/or a message is output with regard to the measured deviation if the temperature $T_M$ determined via the speed of sound deviates from the sensor temperature $T_{sensor}$ in the case where dT/dt is below a certain limit value. For example, according to this design of the method, a change of medium can be detected, wherein the temperature measuring unit can adapt to the changed medium by recalibration.

According to a third teaching, the object set out at the beginning is achieved by a temperature measuring unit described at the beginning in that a relationship $T_M(c)$, established according to one of the methods described above, between the medium temperature $T_M$ of the medium to be measured and the velocity of sound c of a measuring signal is stored in the control and evaluation unit, and that, during operation, the temperature measuring unit determines the current temperature of the medium $T_M$ from the measurement of the velocity of sound c of a measuring signal according to one of the previously described methods.

Such a temperature measuring unit has the advantage that the temperature of the medium can be measured very accurately on the one hand and very quickly on the other hand. In particular, temperature changes or the temperature of a flowing medium can be detected particularly accurately and quickly.

According to an advantageous design, the temperature measuring unit has an ultrasonic transducer that is designed both as an ultrasonic transmitter and as an ultrasonic receiver.

In a particularly simple arrangement, the temperature measuring unit with the ultrasonic transducer, which is designed as an ultrasonic transmitter and as an ultrasonic receiver, is arranged, for example, on a measuring tube, wherein the ultrasonic transducer is aligned in such a way that, as an ultrasonic transmitter, it emits a measurement signal essentially perpendicular to the flow direction of a medium flowing through the measuring tube and that, as an ultrasonic receiver, it receives the measurement signal after reflection at the opposite inner wall of the measuring tube.

According to a fourth teaching of the present invention, the object set out at the beginning is achieved by an ultrasonic flowmeter described at the beginning in that the temperature measuring unit is designed according to the invention so that, during operation, the ultrasonic flowmeter determines, on the one hand, the flow velocity of the medium from the transit time of a first measuring signal which passes through the medium both in the direction of flow and in the opposite direction to the direction of flow and, on the other hand, determines the temperature of the medium by measuring the velocity of sound c of the first measuring signal or of a second measuring signal.

According to one design, the at least one ultrasonic transmitter and the at least one ultrasonic receiver of the temperature measuring device are identical to the ultrasonic transmitter and the ultrasonic receiver of the ultrasonic flowmeter for determining the flow rate of the flowing medium.

For example, the ultrasonic flowmeter has at least two ultrasonic transducers that are both ultrasonic transmitters and ultrasonic receivers.

According to another design, the ultrasonic flowmeter comprises, in addition to the temperature measuring unit, at least one further ultrasonic transmitter and at least one further ultrasonic receiver forming the ultrasonic measuring device for measuring the flow of a medium flowing through the measuring tube. According to this design, in particular the temperature measuring device can be designed as an ultrasonic transducer which operates both as an ultrasonic transmitter and as an ultrasonic receiver, wherein the ultrasonic transducer is arranged and aligned on the measuring tube in such a way that, as an ultrasonic transmitter, it emits a measurement signal essentially perpendicular to the direction of flow of the flowing medium and receives the measurement signal again after reflection at the opposite inner wall of the measuring tube.

Since the time constant τ depends on the flow velocity of the flowing medium, according to one design, the present flow velocity determined by means of the flowmeter is also taken into account by the control and evaluation unit for determining the medium temperature by scaling τ. A determination of the medium temperature according to this design is particularly accurate.

The ultrasonic flowmeter can be designed as a clamp-on measuring device in such a way that the at least one ultrasonic transmitter and the at least one ultrasonic receiver are placed on the outside of the measuring tube. In addition, the ultrasonic flowmeter can also be designed in such a way that the at least one ultrasonic transmitter and the at least one ultrasonic receiver are integrated into the measuring tube wall.

According to a further advantageous design, the temperature measuring unit is arranged on the measuring tube in such a way that the ultrasonic transmitter and the ultrasonic receiver are arranged substantially planar to the inner wall of the measuring tube.

This design has the advantage that changes in the medium, for example changes in the temperature of the medium, are detected directly by the ultrasonic transmitter and the ultrasonic receiver, since there are no dead times to be taken into account, which are due, for example, to backward-displaced arrangements. This arrangement is particularly advantageous for detecting short-term fluctuations.

DESCRIPTION OF THE DRAWINGS

There is now a plurality of possibilities for designing and further developing the methods according to the invention, the temperature measuring unit according to the invention and the ultrasonic flowmeter according to the invention. For this, reference is made to the description of preferred embodiments in conjunction with the drawings.

DETAILED DESCRIPTION

Figure 1:
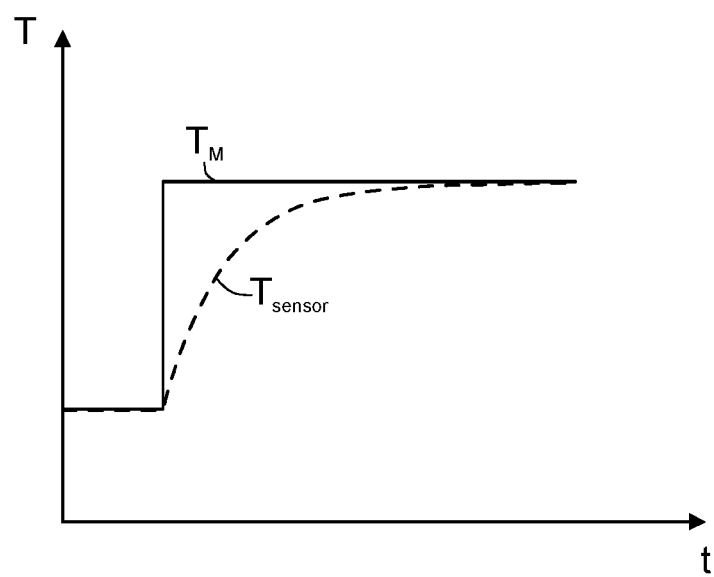
FIG. 1 illustrates the temperature curve of an abruptly changing medium temperature and the adaptation of the temperature of a temperature sensor.

FIG. 1 shows the behavior of a temperature sensor 12, in the case where the medium to be measured changes its temperature abruptly. It can be seen from the illustration that after an initial agreement of the temperature, the temperature sensor 12 can only follow the abrupt change of the medium temperature $T_M$ with a delay. After a time interval, the sensor temperature $T_{sensor}$ again matches the medium temperature $T_M$.

Figure 2:
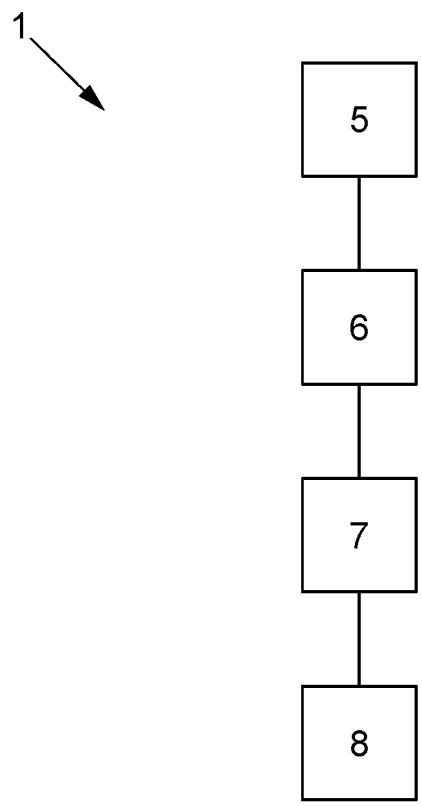
FIG. 2 illustrates a first embodiment of a method according to the invention for the calibration of a temperature measuring unit.

FIG. 2 shows a first method 1 for calibrating a temperature measuring unit 3. The temperature measuring unit 3 comprises an ultrasonic measuring device 10 and a temperature sensor 12. The ultrasonic measuring device 10 comprises an ultrasonic transmitter and an ultrasonic receiver, wherein the ultrasonic receiver is arranged to receive a measurement signal 11 transmitted by the ultrasonic transmitter after passing through the medium. The temperature sensor 12 is arranged to measure the temperature of the medium.

In a first step 5, at least the velocity of sound c of a measurement signal, the temperature $T_{sensor}$ measured by means of a temperature sensor 12 and the variation over time of the sensor temperature dT/dt are determined at at least two measurement points, wherein the at least two measurement points have a different medium temperature $T_M$.

In a next step 6, the medium temperature $T_M$ is determined from the measured temperature $T_{sensor}$, taking into account the time variation of the sensor temperature dT/dt, so that at least three pairs of values $(T_{M1}, c_1)$, $(T_{M2}, c_2)$ and $(T_{M3}, c_3)$ exist. According to this embodiment, the sensor temperature $T_{sensor}$ is recorded on each measurement point under the condition that the time variation of the measured temperature dT/dt is below a specified limit. In this case, this ensures that the measured sensor temperature $T_{sensor}$ corresponds to the medium temperature $T_M$ in the best possible way.

In a next step 7, the empirical functional relationship $T_M(c)$ is determined by forming the compensation curve through the pairs of values. The compensation curve corresponds to a polynomial fit through the pairs of values.

Then, the empirical functional relationship $T_M(c)$ is stored 8 in the temperature measurement unit 3.

Figure 3:
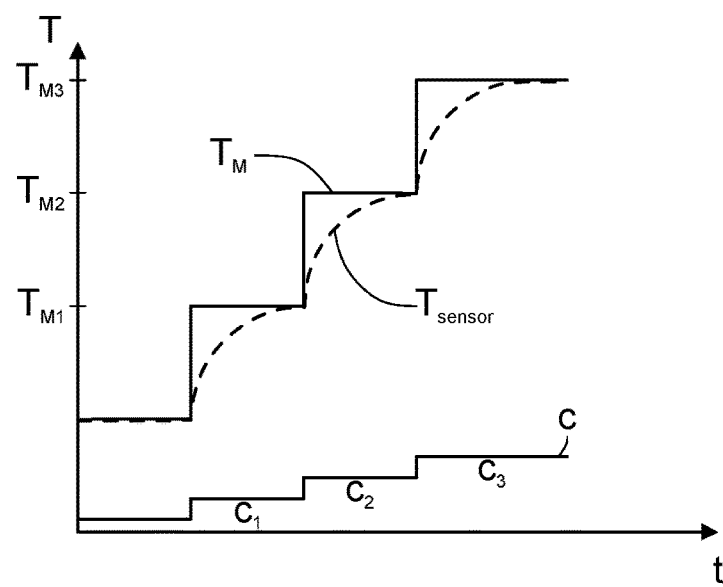
FIG. 3 illustrates the temperature curve of the temperature of the medium $T_M$ and the temperature of a sensor $T_{sensor}$ during temperature changes.

FIG. 3 shows the curve of the change of the medium temperature $T_M$, the sensor temperature $T_{sensor}$ as well as the velocity of sound c for recording the individual value pairs $(T_{M1}, c_1)$, $(T_{M2}, c_2)$ and $(T_{M3}, c_3)$ according to the method shown in FIG. 2.

Figure 4:
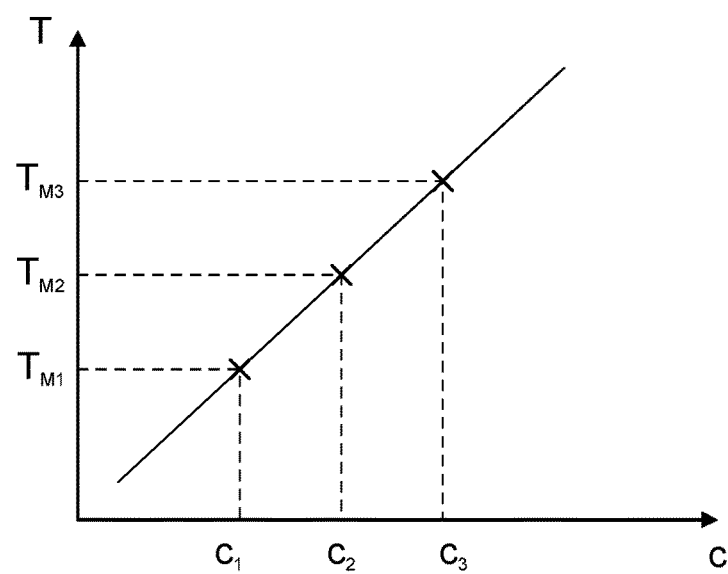
FIG. 4 illustrates the functional relationship between the velocity of sound c and the temperature of the medium $T_M$.

FIG. 4 shows the individual value pairs $(T_{M1}, c_1)$, $(T_{M2}, c_2)$ and $(T_{M3}, c_3)$ together with the compensation curve describing the empirical functional relationship $T_M(c)$ between the medium temperature $T_M$ and the speed of sound c.

Figure 5:
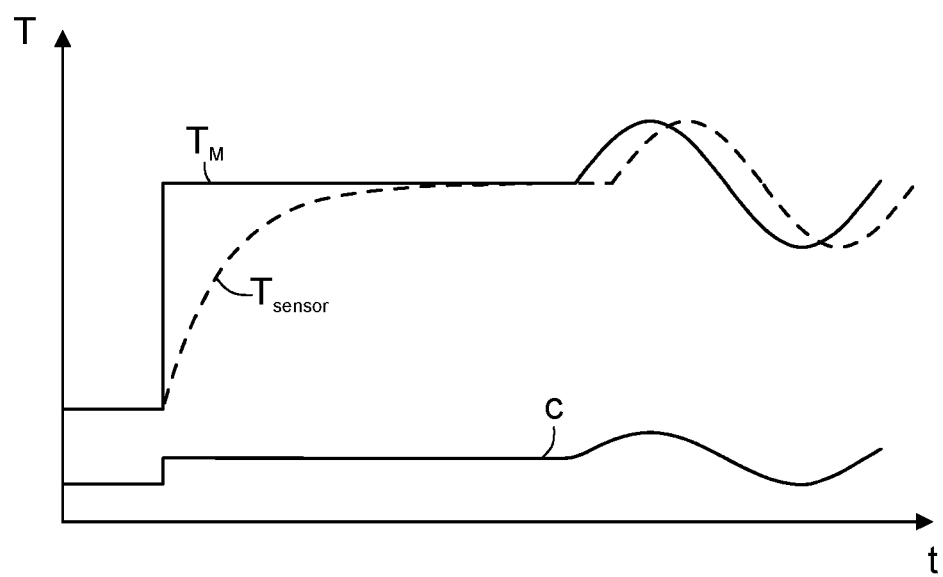
FIG. 5 illustrates the temperature curve of the temperature of the medium $T_M$ and the temperature of the sensor $T_{sensor}$ in the case of sudden and continuous temperature changes of the medium as well as the simultaneously detected velocity of sound c.

FIG. 5 shows the curve of the change in the medium temperature $T_M$, the sensor temperature $T_{sensor}$ and the speed of sound c for recording the individual pairs of values $(T_{M1}, c_1)$, $(T_{M2}, c_2)$ and $(T_{M3}, c_3)$, wherein, in contrast to the embodiment shown in FIGS. 2 to 4, the sensor temperature values $T_{sensor}$, which lie in the course of a temperature change, are also taken into account. This has the advantage that the time required to determine the value pairs $(T_{M1}, c_1)$ to $(T_{Mn}, c_n)$ can be minimized.

Figure 6:
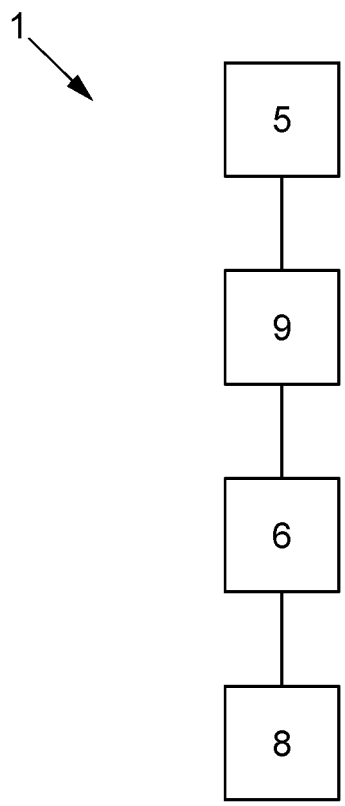
FIG. 6 illustrates a second embodiment of a method for calibrating a temperature measuring unit.

FIG. 6 shows a further embodiment of a method 1 according to the invention for calibrating a temperature measuring unit 3. In a first step 5, at least the velocity of sound c of a measurement signal, the temperature $T_{sensor}$ measured by means of a temperature sensor 12 and the variation over time of the sensor temperature dT/dt are determined at at least two measurement points, wherein the at least two measurement points have a different medium temperature $T_M$.

In a next step 6, the medium temperature $T_M$ is determined from the measured temperature $T_{sensor}$, taking into account the time variation of the sensor temperature dT/dt. In an advantageous manner, the transition between the at least two medium temperatures $T_M$ is also taken into account in the embodiment shown for establishing the relationship sought between the speed of sound c and the medium temperature $T_M$.

For this, the time constant τ of the temperature measuring unit is first estimated 9 with the help of the correlation $T_M = T_{sensor} + \tau * dT/dt$ in such a way that the values $T_M$ and c determined in this way give a smooth, i.e. unambiguous, functional correlation.

The correlation $T_M(c)$ determined in this way is then stored 8 in the temperature measuring unit 3. With the help of this correlation, the medium temperature can be determined particularly accurately and quickly during further operation by measuring the speed of sound c.

Figure 7A:
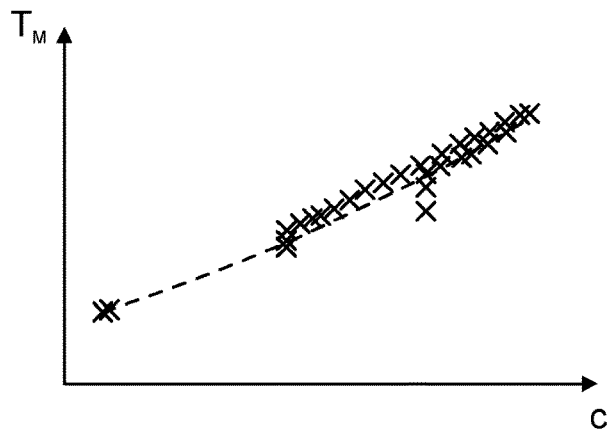
FIGS. 7a to 7c illustrate the relationship between the velocity of sound c and the calculated medium temperature $T_M$ at different estimates of the time constant τ.
Figure 7B:
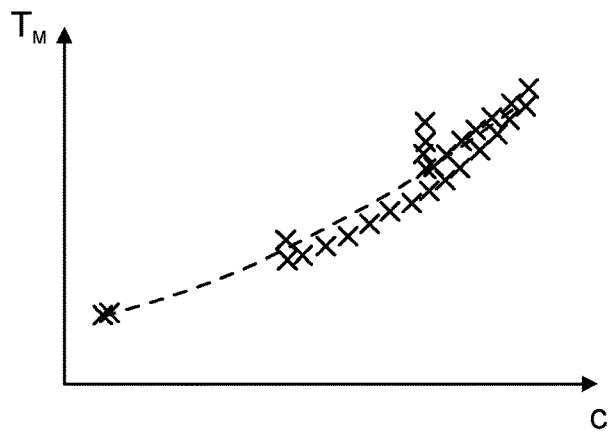
Figure 7C:
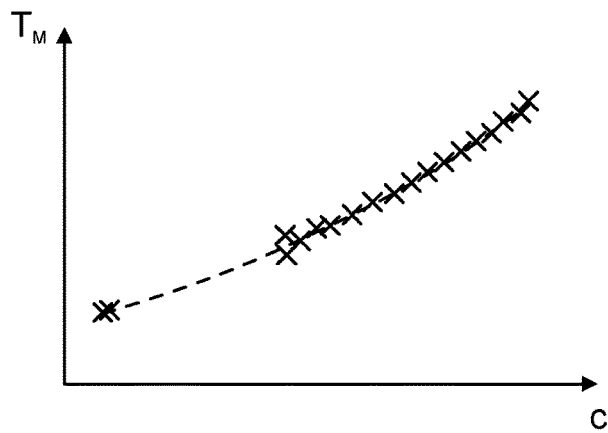

The following FIGS. 7a to 7c show the result of different estimations of the time constant τ for the best possible establishment of a correlation between the medium temperature $T_M$ and the velocity of sound c.

FIGS. 7a and 7b show the correlation between $T_M$ and c, for the case when the time constant τ was not estimated correctly. A smooth correlation between $T_M$ and c cannot be seen.

FIG. 7c shows a smooth correlation between the medium temperature $T_M$ and c. A functional relationship between $T_M$ and c can be established via the compensation curve of the values shown, so that the medium temperature $T_M$ can be determined via the measurement of the velocity of sound c.

Figure 8:
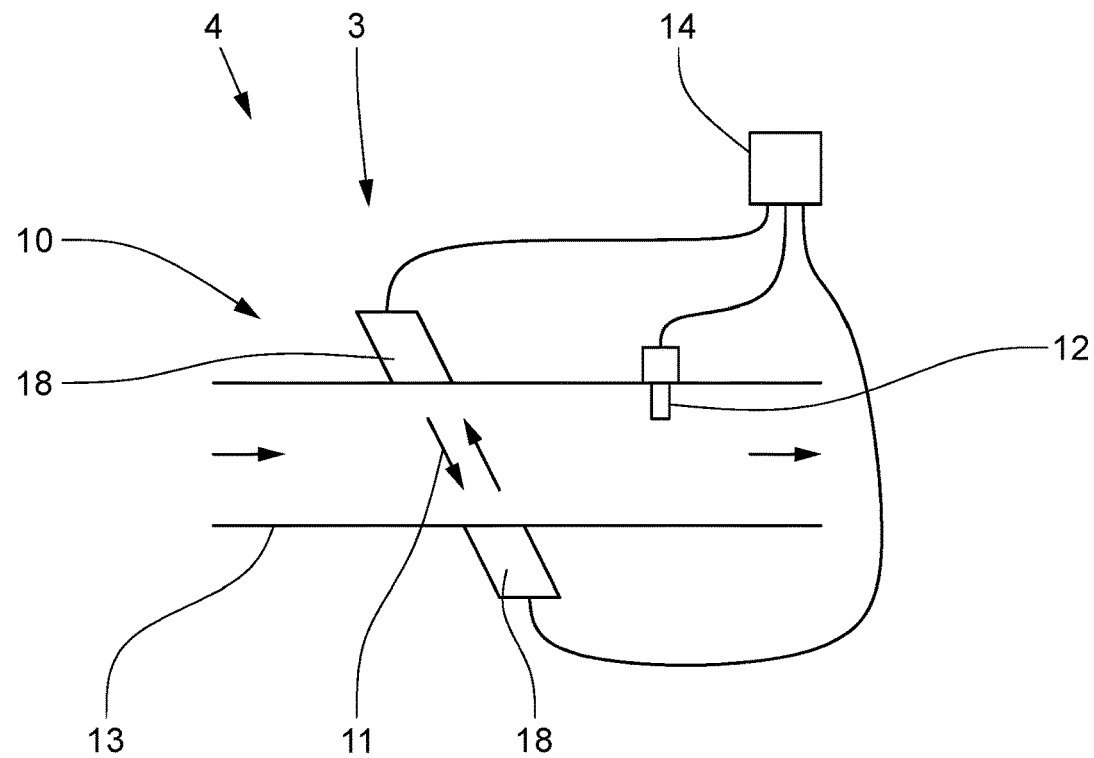
FIG. 8 illustrates an embodiment of a temperature measuring unit and an ultrasonic flowmeter.

FIG. 8 shows a temperature measuring unit 3 comprising an ultrasonic measuring device 10, with two ultrasonic transducers 18, each designed as a transmitter and receiver, for transmitting and receiving a measuring signal 11. In addition, a temperature sensor 12 is provided, which determines the temperature of the medium located in the measuring tube 13. Furthermore, a control and evaluation unit 14 is provided, which determines the temperature of the medium from the measured velocity of sound of a measuring signal 11.

In addition, the temperature measuring unit 3 is designed in such a way that it can determine not only the medium temperature $T_M$ via the present velocity of sound c. Rather, the temperature measuring unit 3 can monitor, during operation, whether the temperature values determined via the speed of sound are correct, or whether an adjustment of the estimate of τ by communicating with the temperature sensor 12 and thus a recalibration is required. In this respect, the temperature measuring unit 3 is equally suitable for detecting changes in the process conditions, such as a change of media.

The ultrasonic measuring unit 10 shown is likewise arranged and designed in such a way that the flow velocity of the medium can be determined by measuring the difference in transit time of the measuring signal 11 in and against the flow direction of the flowing medium. In this respect, FIG. 8 likewise shows an ultrasonic flowmeter 4 which, in an advantageous manner, can simultaneously determine the medium temperature $T_M$ particularly quickly.

Figure 9:
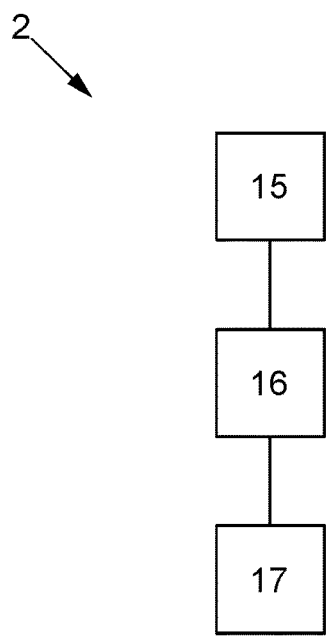
FIG. 9 illustrates a method for measuring the temperature of a flowing medium.

FIG. 9 shows a method 2 for measuring the temperature of a flowing medium by means of a temperature measuring unit 3 calibrated with a method 1 according to the embodiment shown in FIG. 2 or 6.

In a first step 15, a measurement signal 11 is emitted into the medium. In a next step, the velocity of sound c is determined from the transit time of the measurement signal 16. The medium temperature $T_M$ is determined 17 from the velocity of sound c according to the stored relationship $T_M(c)$.

The illustrated method for measuring the temperature of a medium has the advantage that it enables a particularly accurate and fast temperature measurement.

The invention claimed is:

1. A method for calibrating a temperature measuring unit based on ultrasound measurement, wherein the temperature measuring unit includes a temperature sensor and an ultrasound measuring device with at least one ultrasound transmitter and at least one ultrasound receiver, the method comprising:
   establishing an empirical functional relationship $T_M(c)$ between a medium temperature $T_M$ of a medium to be measured and a sound velocity c of a measurement signal, emitted by the at least one ultrasound transmitter and received by the at least one ultrasound receiver of the ultrasound measuring device, and passing through the medium to be measured, comprising:
      capturing, at a first measuring point, a first sound velocity $c_1$ of the measurement signal by means of the ultrasound measuring device and a first sensor temperature measured by means of the temperature sensor;

capturing, at a second measuring point, a second sound velocity $c_2$ of the measurement signal by means of the ultrasound measuring device and a second sensor temperature measured by means of the temperature sensor, wherein the first measuring point differs from the second measuring point and wherein the first sensor temperature and the second sensor temperature are different;

determining a first medium temperature $T_{M1}$ from the first sensor temperature and a second medium temperature $T_{M2}$ from the second sensor temperature using a time variation of the sensor temperature dT/dt, to generate at least two pairs of values ($T_{M1}$, $c_1$) and ($T_{M2}$, $c_2$);

determining a compensating curve through the at least two pairs of values to generate the empirical functional relationship $T_M(c)$; and storing the empirical functional relationship $T_M(c)$ in the temperature measuring unit.

2. The method according to claim 1, wherein, from at least two measuring points, the time variation of the sensor temperature dT/dt and/or a temporal variation of the sound velocity dt is below a fixed limit value.

3. The method according to claim 2, wherein, when determining a medium temperature $T_M$ from a sensor temperature $T_{sensor}$, a time constant τ describing an inertia of the temperature sensor is additionally utilized in the determination.

4. The method according to claim 1, wherein, when determining a medium temperature $T_M$ from a sensor temperature $T_{sensor}$, a time constant τ describing an inertia of the temperature sensor is additionally utilized in the determination.

5. The method according to claim 4, wherein, for determining the medium temperature $T_M$, the time constant τ is estimated from the sensor temperature $T_{sensor}$ in such a way that the at least two pairs of values ($T_{M1}$, $c_1$) and ($T_{M2}$, $c_2$) have a functional relationship.

6. The method according to claim 5, wherein the medium temperature $T_M$ is determined from the sensor temperature $T_{sensor}$ by means of the relationship $T_M = T_{sensor} + \tau \cdot dT/dt$; and wherein the time constant τ is estimated in such a way that the at least two pairs of values ($T_{M1}$, $c_1$) and ($T_{M2}$, $c_2$) correspond to the functional relationship.

7. The method according to claim 1, wherein a pressure p of the medium is additionally measured at each measuring point and a pressure functional relationship $T_M(c,p)$ is established between a medium temperature $T_M$, a sound velocity c and the pressure p of the medium.

8. A method for measuring a temperature of a medium with a temperature measuring unit, wherein the temperature measuring unit includes a temperature sensor and an ultrasonic measuring device with at least one ultrasonic transmitter and at least one ultrasonic receiver, the method comprising:

calibrating the temperature measuring unit with a calibration method including the following steps:

establishing an empirical functional relationship $T_M(c)$ between a medium temperature $T_M$ of a medium to be measured and a sound velocity c of a measurement signal, emitted by the at least one ultrasonic transmitter and received by the at least one ultrasonic receiver of the ultrasonic measuring device, and passing through the medium to be measured, comprising:

capturing, at a first measuring point, a first sound velocity $c_1$ of the measurement signal by means of the ultrasonic measuring device and a first sensor temperature measured by means of the temperature sensor;

capturing, at a second measuring point, a second sound velocity $c_2$ of the measurement signal by mean so the ultrasonic measuring device and a second sensor temperature measured by means of the temperature sensor, wherein the first measuring point differs from the second measuring point and wherein the first sensor temperature and the second sensor temperature are different;

determining a first medium temperature $T_{M1}$ from the first sensor temperature and a second medium temperature $T_{M2}$ from the second sensor temperature using a time variation of the sensor temperature dT/dt, to generate at least two pairs of values ($T_{M1}$, $c_1$) and ($T_{M2}$, $c_2$);

determining a compensating curve through the at least two pairs of values to generate the empirical functional relationship $T_M(c)$; and storing the empirical functional relationship $T_M(c)$ in the temperature measuring unit;

capturing, using the ultrasonic measuring device, a third sound velocity of the measurement signal passing through the medium to be measured; and determining, using the third sound velocity and the empirical functional relationship $T_M(c)$, a current temperature of the medium.

9. The method according to claim 8, wherein, during operation of the temperature measuring unit, a temperature of the medium is determined using measurements acquired by means of the ultrasonic measuring device and by means of the temperature sensor; and wherein a temperature $T_M$ determined by means of a sound velocity c from the ultrasonic measuring device is compared with a sensor temperature $T_{sensor}$ from the temperature sensor.

10. The method according to claim 9, wherein if the temperature $T_M$ determined via the sound velocity c deviates from the sensor temperature $T_{sensor}$ and the time variation of the sensor temperature dT/dt is below a specified limit value, the temperature measuring unit automatically recalibrates the empirical functional relationship $T_M(c)$ according to the calibration method and/or a message is output with regard to a measured deviation.

11. A temperature measuring unit for measuring the temperature of a medium, comprising:

at least one temperature sensor;

at least one ultrasonic measuring device, wherein the ultrasonic measuring device has at least one ultrasonic transmitter and at least one ultrasonic receiver; and a control and evaluation unit;

wherein a relationship $T_M(c)$, established according to a calibration method, between a medium temperature $T_M$ of the medium to be measured and a sound velocity c of a measurement signal is stored in the control and evaluation unit;

wherein the calibration method includes the following steps: control and evaluation unit is configured to execute the calibration method comprising:

establishing an empirical functional relationship $T_M(c)$ between the medium temperature $T_M$ of the medium to be measured and the sound velocity c of the measurement signal, emitted by the at least one ultrasonic transmitter and received by the at least one ultrasonic receiver of the ultrasonic measuring device, and passing through the medium to be measured;

capturing, at a first measuring point, a first sound velocity $c_1$ of the measurement signal by means of the ultrasonic measuring device and a first sensor temperature measured by means of the temperature sensor;

capturing, at a second measuring point, a second sound velocity $c_2$ of the measurement signal by means of the ultrasonic measuring device and a second sensor measured by means of the temperature sensor, wherein the first measuring point differs from the second measuring point and wherein the first sensor temperature and the second sensor temperature are different;

determining a first medium temperature $T_{M1}$ from the first sensor temperature using a time variation of the sensor temperature $dT/dt$, to generate at least two pairs of values $(T_{M1}, c_1)$ and $(T_{M2}, c_2)$;

determining a compensating curve through the at least two pairs of values to generate the empirical functional relationship $T_M(C)$; and storing the empirical functional relationship $T_M(c)$ in the temperature measuring unit; and wherein, during operation, the temperature measuring unit determines a current temperature of the medium using a sound velocity measurement of the measurement signal captured using the ultrasonic measuring device and the empirical functional relationship $T_M(c)$.

\* \* \* \* \*

UNITED STATES PATENT AND TRADEMARK OFFICE
CERTIFICATE OF CORRECTION

| | |
|---|---|
| PATENT NO. | : 12,320,711 B2 |
| APPLICATION NO. | : 17/571111 |
| DATED | : June 3, 2025 |
| INVENTOR(S) | : Cornelis Johannes Hogendoorn |

Page 1 of 1

It is certified that error appears in the above-identified patent and that said Letters Patent is hereby corrected as shown below:

On the Title Page

Item (12) delete "Hogendoor" and insert -- Hogendoorn --

Item (72) Inventor: "Cornelis Johannes Hogendoor, BG Spijk (NL)" should be changed to -- Cornelis Johannes Hogendoorn, BG Spijk (NL) --

Signed and Sealed this
Eighteenth Day of November, 2025

John A. Squires
*Director of the United States Patent and Trademark Office*